United States Patent
Dong et al.

(10) Patent No.: US 12,380,550 B2
(45) Date of Patent: Aug. 5, 2025

(54) METHOD FOR POSITIONING TEA-BUD PICKING POINTS BASED ON FUSED THERMAL IMAGES AND RGB IMAGES

(71) Applicants: Tea Research Institute, Chinese Academy of Agricultural Sciences, Hangzhou (CN); Tea Research Institute of Shandong Academy of Agricultural Sciences, Jinan (CN)

(72) Inventors: Chunwang Dong, Jinan (CN); Yang Li, Hangzhou (CN); Mei Wang, Jinan (CN); Jianneng Chen, Hangzhou (CN); Rentian Zhang, Hangzhou (CN); Yifan Cheng, Hangzhou (CN); Jiayin Jiang, Hangzhou (CN); Muzhe Wang, Hangzhou (CN)

(73) Assignees: Tea Research Institute, Chinese Academy of Agricultural Sciences, Hangzhou (CN); Tea Research Institute of Shandong Academy of Agricultural Sciences, Jinan (CN)

( * ) Notice: Subject to any disclaimer, the term of this patent is extended or adjusted under 35 U.S.C. 154(b) by 465 days.

(21) Appl. No.: 17/986,146

(22) Filed: Nov. 14, 2022

(65) Prior Publication Data

US 2023/0289945 A1     Sep. 14, 2023

(30) Foreign Application Priority Data

Mar. 8, 2022 (CN) .................. 202210228036.X

(51) Int. Cl.
 *G06T 7/00* (2017.01)
 *G06T 5/50* (2006.01)
(52) U.S. Cl.
 CPC .............. *G06T 7/0004* (2013.01); *G06T 5/50* (2013.01); *G06T 2207/20081* (2013.01);
(Continued)

(58) Field of Classification Search
 CPC ................. G06T 7/0004; G06T 5/50; G06T 2207/20081; G06T 2207/20084;
(Continued)

(56) References Cited

U.S. PATENT DOCUMENTS 11,068,754 B1 * 7/2021 Flowers ............... G06V 20/647
2025/0022168 A1 * 1/2025 Garrido ..................... G06T 7/74

OTHER PUBLICATIONS

Gong, Tao, and ZiLong Wang. "A tea tip detection method suitable for tea pickers based on YOLOv4 network." 201 3rd International Symposium on Robotics & Intelligent Manufacturing Technology (ISRIMT). IEEE, 2021. (Year: 2021).*

* cited by examiner

Primary Examiner — Bobbak Safaipour
(74) Attorney, Agent, or Firm — WPAT, PC

(57) ABSTRACT

A method for positioning tea-bud picking points based on fused thermal images and RGB images is provided and includes: firstly, image pairs of several tea buds are acquired by using an image acquisition device, and are each labeled to obtain a tea-bud object detection database and a tea-bud keypoint detection database; secondly, in order to obtain a trained object detection model and a trained keypoint detection model, the tea-bud object detection database and the tea-bud keypoint detection database are inputted into an object detection model and a keypoint detection model for training, respectively; finally, the trained object detection model and keypoint detection model are used to sequentially process the tea-bud image pairs to obtain tea-bud keypoint positions, and then tea-bud picking point positions are obtained in combination with the tea-bud growth characteristics. The positioning accuracy and efficiency of the tea-bud picking points can be improved.

8 Claims, 6 Drawing Sheets

(52) U.S. Cl.
CPC ............... *G06T 2207/20084* (2013.01); *G06T 2207/20221* (2013.01); *G06T 2207/30188* (2013.01)

(58) Field of Classification Search
CPC . G06T 2207/20221; G06T 2207/30188; G06T 3/4053; G06N 3/0464; G06N 3/084; G06N 3/045; G06N 3/08; G06V 10/764; G06V 20/60; G06V 10/462; G06F 18/214
See application file for complete search history.

METHOD FOR POSITIONING TEA-BUD PICKING POINTS BASED ON FUSED THERMAL IMAGES AND RGB IMAGES

FIELD OF THE INVENTION

The present invention relates to the technical fields of artificial intelligence recognition, machine vision and image processing, in particular to a method for positioning tea-bud picking points based on fused thermal images and RGB images.

BACKGROUND OF THE INVENTION

Tea-picking methods are mainly divided into a manual picking method and a mechanical picking method. The manual picking method is a selective method, so as to allow high-quality tea to be picked. By observing the shape, color and other characteristics of a tea bud, people can judge the grade and whether the tea bud is suitable for picking, thereof pick the tea bud by breaking it at a designated position. This method ensures the shape integrity of the tea bud, and obtains high-quality tea; however, its cost is high, and there will be a "labor shortage" problem in the tea picking season every year due to the optimization and adjustment of industrial structure and the transfer of labor force.

In recent years, vision-based automatic picking robots have been used for the picking of famous and high-quality tea; therefore, the automatic identification and positioning of the picking points has become a keypoint and difficulty affecting the development of this technology. With the light weight of the famous and high-quality tea, the wind blowing or the movement of the picking machine will cause the tea leaves to swing; the complex tea garden environment makes the tea leaves may block each other; the uneven brightness of the light in the tea garden results in difficulty in distinguishing young buds from old leaves. These factors make it very difficult to identify and position the tea-bud picking points, which severely limits the automatic picking of the famous and high-quality tea. The currently used method for positioning the tea-bud picking points has low positioning accuracy and efficiency. In order to quickly identify and position the picking points, ensure the machine-picking efficiency of the famous and high-quality tea, and meet the requirements for high quality, it is necessary to develop a method for obtaining the information of the picking points of the famous and high-quality tea.

CONTENTS OF THE INVENTION

The main object of the present invention is to propose a method for positioning tea-bud picking points based on fused thermal images and RGB images, so as to improve the positioning accuracy and efficiency of the tea-bud picking points.

In order to achieve the above object, the present invention provides a method for positioning tea-bud picking points based on fused thermal images and RGB images, which comprises the following steps:

tea-bud image pairs, including tea-bud thermal images and tea-bud RGB images, of several tea buds are acquired;

the tea-bud image pairs are each labeled to obtain a tea-bud object detection database and a tea-bud keypoint detection database;

the tea-bud object detection database is inputted into an object detection model based on a deep convolutional neural network for training to obtain a trained object detection model;

the tea-bud keypoint detection database is inputted into a keypoint detection model for training to obtain a trained keypoint detection model;

the image pairs of tea buds to be picked are acquired by using an image acquisition device;

tea-bud keypoint positions are obtained according to the image pairs and the trained object detection model and keypoint detection model; and tea-bud picking point positions are obtained based on the tea-bud keypoint positions and tea-bud growth characteristics.

Optionally, the step that the tea-bud image pairs are each labeled to obtain a tea-bud object detection database and a tea-bud keypoint detection database comprises the following steps:

the tea-bud image pairs are each labeled according to input data formats of two tasks of object detection and keypoint detection, so as to obtain the corresponding object detection dataset and keypoint detection dataset and the object detection dataset and the keypoint detection dataset are augmented to obtain the tea-bud object detection database and the tea-bud keypoint detection database, respectively.

Optionally, the step that the tea-bud object detection database is inputted into an object detection model based on a deep convolutional neural network for training to obtain a trained object detection model comprises the following steps:

the tea-bud object detection database is divided into an object detection training set and an object detection validation set according to a first preset ratio;

the object detection training set is inputted into the object detection model based on the deep convolutional neural network for training to obtain an object detection model weight file; and the trained keypoint detection model weight file is loaded into the keypoint detection model to obtain the trained keypoint detection model.

Optionally, the step that the tea-bud keypoint detection database is inputted into a keypoint detection model for training to obtain a trained keypoint detection model comprises the following steps:

the tea-bud keypoint detection database is divided into a keypoint training set and a keypoint validation set according to a second preset ratio;

the keypoint training set is inputted into the keypoint detection model for training to obtain a keypoint detection model weight file; and the trained keypoint detection model weight file is loaded into the keypoint detection model to obtain the trained keypoint detection model.

Optionally, the step that the keypoint training set is inputted into the keypoint detection model for training to obtain a keypoint detection model weight file comprises the following steps:

based on the HRNet network, an improved keypoint detection model is established by using Pytorch program; in the improved keypoint detection model, the number of the input layer of the keypoint detection model is improved to 4 channels for inputting a fused image of the thermal images and the RGB images;

the keypoint training set is continuously and iteratively inputted into the keypoint detection model in batches; when the model converges, the training of the keypoint detection model is completed; and the keypoint detection model weight file is obtained according to the trained keypoint detection model.

Optionally, loss functions of the keypoint detection model are as follows:

$$\min L=\lambda 1\times L1+\lambda 2\times L2+\lambda 3\times L3;$$

$$L1=\Sigma_{k=1}^{K}(\hat{y}(P_k)-y(P_k))^2;$$

$$L2=d(P_1,C);$$

$$L3=d(P_2,C);$$

among them, $\lambda 1$, $\lambda 2$ and $\lambda 3$ are weight coefficients of L1, L2 and L3, respectively; $P_k$ represents the k-th keypoint of a sample, $\hat{y}(P_k)$ represents a keypoint heat map predicted by the network, and $y(P_k)$ represents a heat map obtained from real values; and $d(P_1, C)$ represents the Euclidean distance from a tea-bud keypoint predicted by the network to the center C of a rectangular region where the keypoint is located.

Optionally, the step that tea-bud keypoint positions are obtained according to the image pairs and the trained object detection model and keypoint detection model comprises the following steps:

the object detection is carried out on the image pairs through the trained object detection model to obtain tea-bud detection results; and the keypoint detection is carried out on the tea-bud detection results through the trained keypoint detection model to obtain the keypoint positions.

Optionally, the step that tea-bud picking point positions are obtained based on the tea-bud keypoint positions and tea-bud growth characteristics comprises the following steps:

when two points P1 and P2 are used as the tea-bud keypoints, and d is the Euclidean distance between the two keypoints, a straight-line equation is established by using the points P1 and P2, and a point on a line segment P1P2 with a distance of 0.4×d from the point P1 is taken as the tea-bud picking point position; and when one point P1 or P2 is used as the tea-bud keypoint, image segmentation is performed based on the position and region growth algorithm of the point P1 or P2, so as to obtain a binarized image of a tea-bud trunk and branches; the noise therein is filtered out by a dilation and erosion operation, and then the binarized image is fitted by a straight-line fitting method, and the keypoint is shifted downward on the straight line by a preset distance to determine the tea-bud picking point position.

The present invention provides a method for positioning tea-bud picking points based on fused thermal images and RGB images. Through the above method, the present invention can determine the picking points according to the growth posture of the tea buds, thereby ensuring that the coordinates of the positioned picking points all fall on the petiole of the tea buds, improving the integrity of the picked tea buds, reducing the influence of the surrounding environment on the positioning, and improving the positioning accuracy and efficiency of the tea-bud picking points.

The object achievement, functional characteristics and advantages of the present invention will be further described in combination with examples and drawings.

DETAILED DESCRIPTION OF THE EMBODIMENTS

Figure 1:
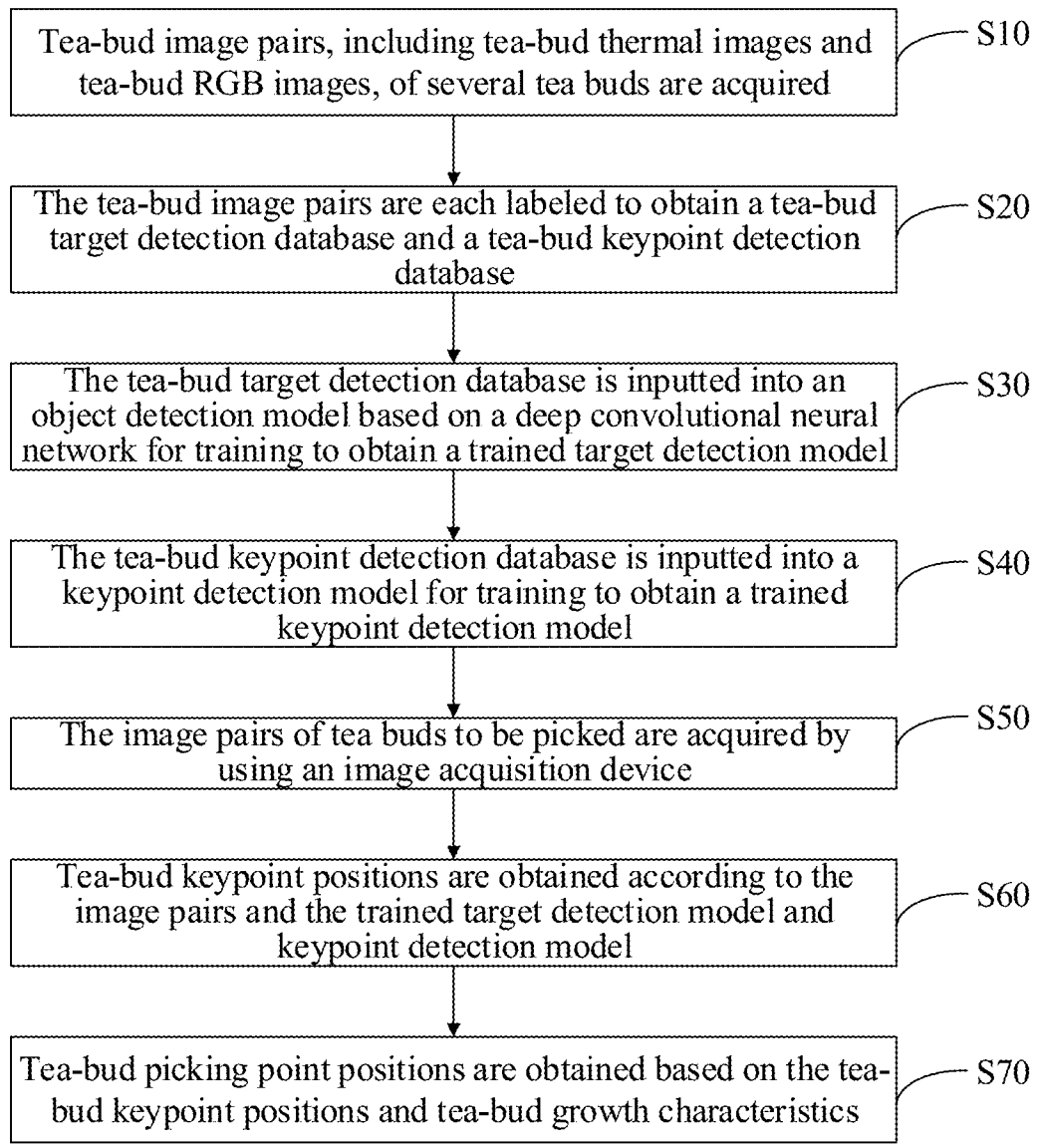
FIG. 1 is a schematic flowchart of the method for positioning tea-bud picking points based on fused thermal images and RGB images according to Example 1 of the present invention.
Figure 2:
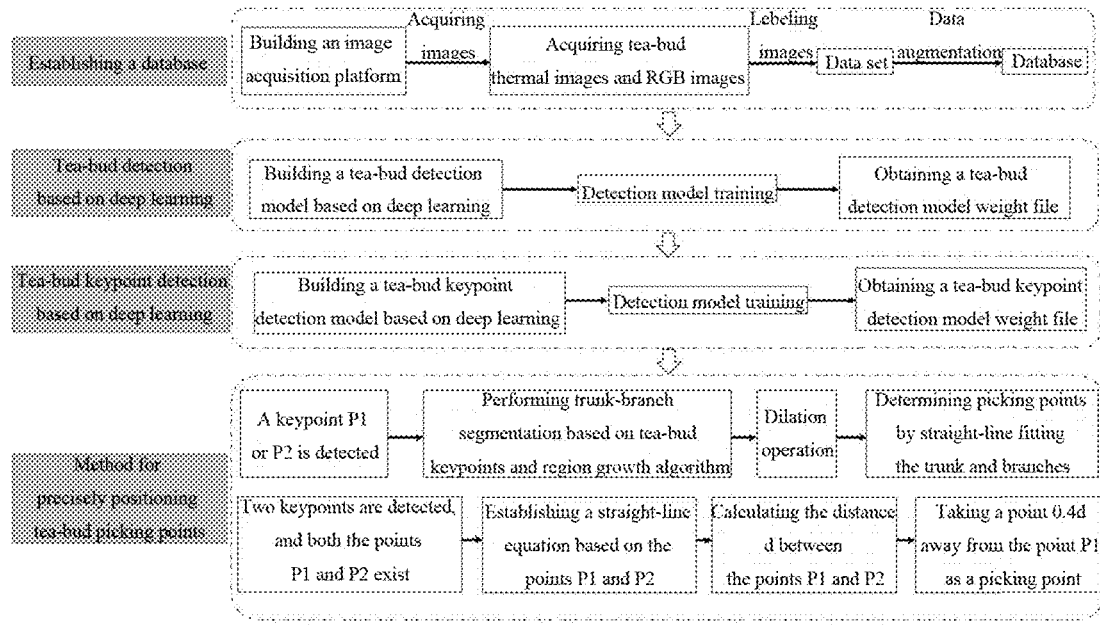
FIG. 2 is a schematic flowchart of the method for positioning tea-bud picking points based on fused thermal images and RGB images according to the present invention.
Figure 3:
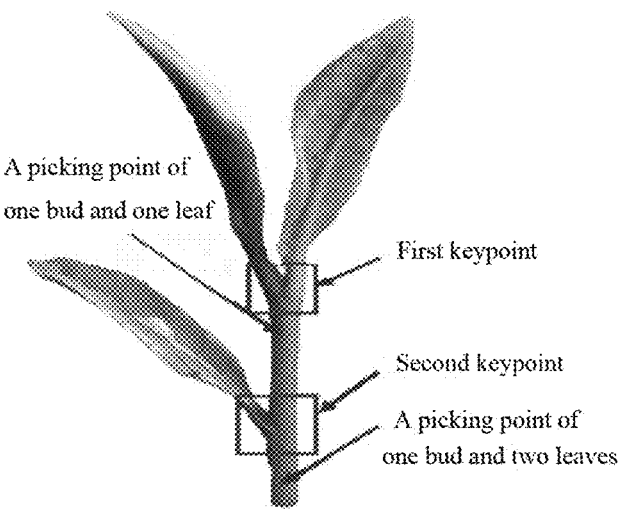
FIG. 3 is a schematic drawing of the keypoint positions of the method for positioning tea-bud picking points based on fused thermal images and RGB images according to the present invention.
Figure 4:
FIG. 4 is a tea-bud thermal image acquired by the method for positioning tea-bud picking points based on fused thermal images and RGB images according to the present invention.
Figure 5:
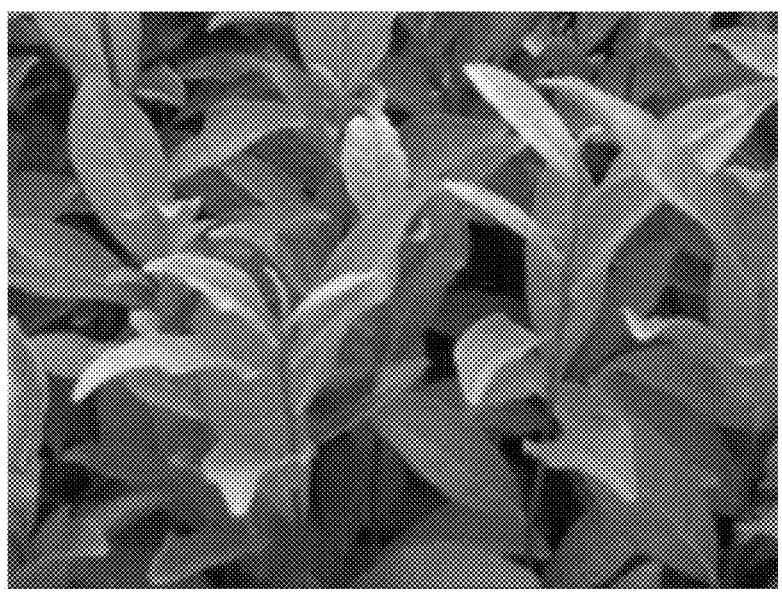
FIG. 5 is a tea-bud RGB image acquired by the method for positioning tea-bud picking points based on fused thermal images and RGB images according to the present invention.

FIG. 1 is a schematic flowchart of the method for positioning tea-bud picking points based on fused thermal images and RGB images according to Example 1 of the present invention.

In the example of the present invention, the method for positioning tea-bud picking points based on fused thermal images and RGB images is applied to a tea-bud picking point positioning device, and comprises the following steps:

Step S10: tea-bud image pairs, including tea-bud thermal images and tea-bud RGB images, of several tea buds are acquired;

in this example, in order to improve the positioning accuracy and efficiency of the tea-bud picking points, the tea-bud picking point positioning device uses an image acquisition device to vertically shoot the image pairs of several tea buds from the side of the tea buds at a height close to the tea buds, so as to collect tea-bud object detection data and tea-bud keypoint detection data; the tea-bud image pair comprise a tea-bud thermal image and a tea-bud RGB image, which are side views of the tea buds, wherein the tea-bud RGB image is a color picture of the tea buds composed of the three primary colors of red, green and blue.

Step S20: the tea-bud image pairs are each labeled to obtain a tea-bud object detection database and a tea-bud keypoint detection database;

in this example, after acquiring the image pairs of several tea buds, the tea-bud picking point positioning device marks each of the tea-bud image pairs to obtain the tea-bud object detection database and the tea-bud keypoint detection database;

step S20 that the tea-bud image pairs are each labeled to obtain a tea-bud object detection database and a tea-bud keypoint detection database may comprise the following steps:

step S21: the tea-bud image pairs are each labeled according to input data formats of two tasks of object detection and keypoint detection, so as to obtain the corresponding object detection dataset and keypoint detection dataset;

in this example, after acquiring the image pairs of several tea buds, the tea-bud picking point positioning device labels each of the tea-bud image pairs respectively according to the input data formats of the two tasks of object detection and keypoint detection, so as to obtain the corresponding object detection dataset and keypoint detection dataset; among them, the method of labeling for the object detection refers to labeling the collected data according to the object detection task, and the method of labeling for the keypoint detection refers to labeling the collected data according to the keypoint detection task; for the object detection, a rectangular region where a tea bud is located on the image is labeled, such that the tea bud is labeled with the coordinate $\{(x1, y1), (x2, y2)\}$, which is composed of the coordinates of the upper left corner and the lower right corner of the rectangular region; for the keypoint detection, two keypoints on a tea bud (a bud-leaf connection point P1 of one bud and one leaf of the tea bud, and a (bud-leaf)-branch connection point P2 of one bud and two leaves of the tea bud) are labeled, such that the tea bud is labeled with $\{(Px1, Py1, V1), (Px2, Py2, V)\}$, which is composed of the information of the two keypoints P1 and P2, wherein the first two numbers are position coordinates, and the third number represents a visibility flag, the flag 0 meaning unlabeled, the flag 1 meaning labeled but invisible, and the flag 2 meaning labeled and visible;

step S22: the object detection dataset and the keypoint detection dataset are augmented to obtain the tea-bud object detection database and the tea-bud keypoint detection database, respectively;

in this example, after obtaining the object detection dataset and the keypoint detection dataset, augmentation operations are performed including image translation, rotation, sharpening, flipping, scaling and other operations, on the object detection dataset and the keypoint detection dataset, so as to expand dataset samples and construct the tea-bud object detection database Do and the tea-bud keypoint detection database Dk, respectively.

Step S30: the tea-bud object detection database is inputted into an object detection model for training to obtain a trained object detection model;

in this example, after obtaining the tea-bud object detection database and the tea-bud keypoint detection database, the tea-bud picking point positioning device inputs the tea-bud object detection database into the object detection model based on the deep convolutional neural network for training to obtain the trained object detection model;

step S30 that the tea-bud object detection database is inputted into an object detection model based on a deep convolutional neural network for training to obtain a trained object detection model may comprise the following steps:

step S31: the tea-bud object detection database is divided into an object detection training set and an object detection validation set according to a first preset ratio;

in this example, after obtaining the tea-bud object detection database and the tea-bud keypoint detection database, the tea-bud picking point positioning device divides the tea-bud object detection database into the object detection training set and the object detection validation set according to the first preset ratio that is 8:2;

step S32: the object detection training set is inputted into the object detection model based on the deep convolutional neural network for training to obtain an object detection model weight file;

in this example, after obtaining the object detection training set, the tea-bud picking point positioning device trains the object detection training set through a deep convolutional neural network model, which is a YOLOV5m model, to obtain the object detection model weight file; and the trained deep convolutional neural network model is validated through the object validation set;

in this example, after obtaining the object detection model weight file and the object detection model, the tea-bud picking point positioning device obtains the object detection model according to the object detection model and the object detection model weight file; the object detection model and its corresponding object detection model weight file together compose a object detection model Fo, which can obtain the coordinates of n rectangular regions of the tea buds and the corresponding confidence scores on the image:

$$F_o(I) = \{((x1n, y1n), (x2n, y2n), sn)\}_{n=1}^{N}$$

where ((x1n, y1n), (x2n, y2n), sn) represents the coordinates of one of the rectangular regions and the corresponding confidence score;

step S33: the trained object detection model weight file is loaded into the object detection model to obtain the trained object detection model;

in this example, after obtaining the object detection model weight file, the tea-bud picking point positioning device loads the trained object detection model weight file into the object detection model to obtain the trained object detection model.

Step S40: the tea-bud keypoint detection database is inputted into a keypoint detection model for training to obtain a trained keypoint detection model;

in this example, after obtaining the tea-bud object detection database and the tea-bud keypoint detection database, the tea-bud picking point positioning device inputs the tea-bud keypoint detection database into the keypoint detection model for training to obtain the trained keypoint detection model;

step S40 that the tea-bud keypoint detection database is inputted into a keypoint detection model for training to obtain a trained keypoint detection model may comprise the following steps:

step S41: the tea-bud keypoint detection database is divided into a keypoint training set and a keypoint validation set according to a second preset ratio;

in this example, after obtaining the tea-bud object detection database and the tea-bud keypoint detection database, the tea-bud picking point positioning device divides the tea-bud keypoint detection database into the keypoint training set and the keypoint validation set according to the second preset ratio that is 8:2;

step S42: the keypoint training set is inputted into the keypoint detection model for training to obtain a keypoint detection model weight file;

in this example, after obtaining the keypoint training set, the tea-bud picking point positioning device trains the keypoint training set through the keypoint detection model to obtain the keypoint detection model weight file;

step S42 that the keypoint training set is inputted into the keypoint detection model for training to obtain a keypoint detection model weight file may comprise the following steps:

step S421: based on the HRNet network, an improved keypoint detection model is established by using Pytorch program; in the improved keypoint detection model, the number of the input layer of the keypoint detection model is improved to 4 channels for inputting a fused image of the thermal images and the RGB images;

in this example, after obtaining the keypoint training set, the tea-bud picking point positioning device uses the Pytorch program to establish the keypoint detection model based on the HRNet network; in the improved keypoint detection model, the number of the input layer of the keypoint detection model is improved to 4 channels for inputting a fused image of the thermal images and the RGB images; among them, the keypoint detection model, based on the HRNet network, can output two characteristic diagrams representing respectively the prediction diagrams of the keypoints P1 and P2, and use the tea-bud keypoint characteristics to redesign the loss functions of the keypoint detection model to be min L=λ1×L1+λ2×L2+λ3×L3;

$$L1 = \Sigma_{k=1}^{K}(\hat{y}(P_k) - y(P_k))^2;$$

$$L2 = d(P_1, C);$$

$$L3 = d(P_2, C);$$

among them, λ 1, λ 2 and λ 3 are weight coefficients of L1, L2 and L3, respectively; $P_k$ represents the k-th keypoint of a sample, $\hat{y}(P_k)$ represents a keypoint heat map predicted by the network, and $y(P_k)$ represents a heat map obtained from real values; and $d(P_1, C)$ represents the Euclidean distance from a tea-bud keypoint predicted by the network to the center C of a rectangular region where the keypoint is located; the loss functions of the keypoint detection model are used to train the keypoint detection model;

step S422: the keypoint training set is continuously and iteratively inputted into the keypoint detection model in batches; when the model converges, the training of the keypoint detection model is completed, and the keypoint detection model weight file is obtained;

in this example, after establishing the keypoint detection model, the tea-bud picking point positioning device continuously and iteratively inputs the keypoint training set into the keypoint detection model in batches; as the iteration progresses, the model will gradually converge, and finally the training of the keypoint detection model is completed to obtain the keypoint detection model weight file; in the training process, when the loss functions of the training set tend to be stable and the degree of declining is small, the model is considered to be convergent, that is, the training is completed; in this model, when the difference between the loss functions of three consecutive epochs is less than 0.1 during the training process, the training will be stopped;

an iterative process in the model training includes forward propagation and backward propagation; during the forward propagation, a batch of image data samples in the training set is inputted into the keypoint detection model, and continuously propagates backward through the convolutional layer in the model, thus finally obtaining the output results of the model, according to which label files are compared and the loss functions of the model are calculated; during the backward propagation, the above loss functions can be used to calculate the partial derivatives of the parameters in the convolutional layer, and the gradient backward propagation can be carried out to update the weight parameters of each convolutional layer in the model, so as to realize the training adjustment of the model;

the keypoint detection model and the corresponding weight file together compose a function $F_k$, from which the positions of the keypoints P1 and P2 can be obtained:

$$F_k(\{((x1n, y1n), (x2n, y2n), sn)\}_{n=1}^{N}) = \{(Pxn, Pyn, Vn)\}_{n=1}^{N}$$

step S43: the trained keypoint detection model weight file is loaded into the keypoint detection model to obtain the trained keypoint detection model;

in this example, after obtaining the keypoint detection model weight file, the tea-bud picking point positioning device loads the trained keypoint detection model weight file into the keypoint detection model to obtain the trained keypoint detection model; and the keypoint detection model is validated through the keypoint validation set.

Step S50: the image pairs of tea buds to be picked are acquired by using an image acquisition device;

in the present example, after obtaining the trained object detection model and keypoint detection model, the tea-bud picking point positioning device uses the image acquisition device to shoot the image pair I of the tea bud to be picked, wherein the image pair is the thermal image and RGB image of the tea bud to be picked.

Figure 6:
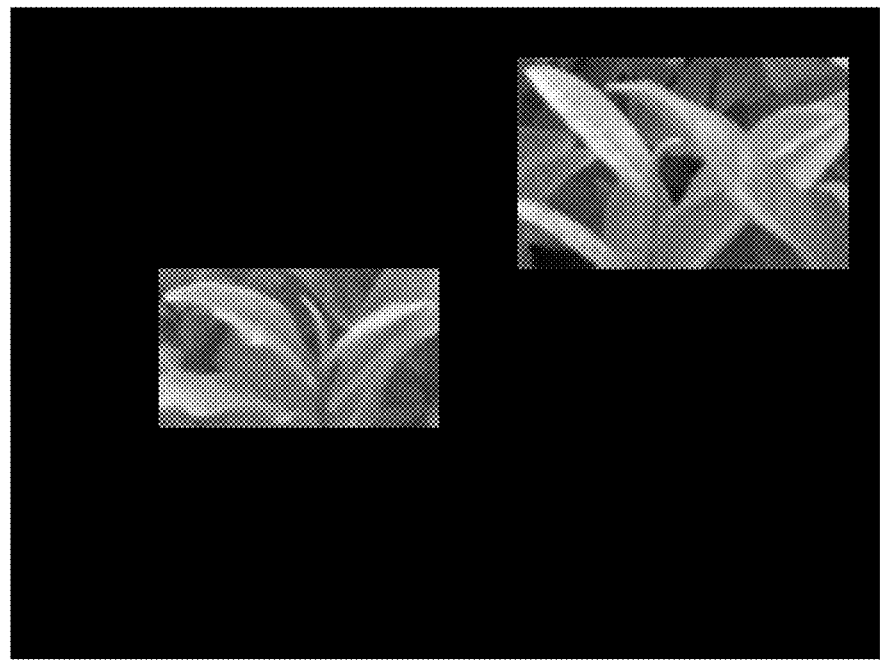
FIG. 6 is an effect diagram of the present invention after executing the object detection model on the tea-bud thermal image and the tea-bud RGB image.
Figure 7:
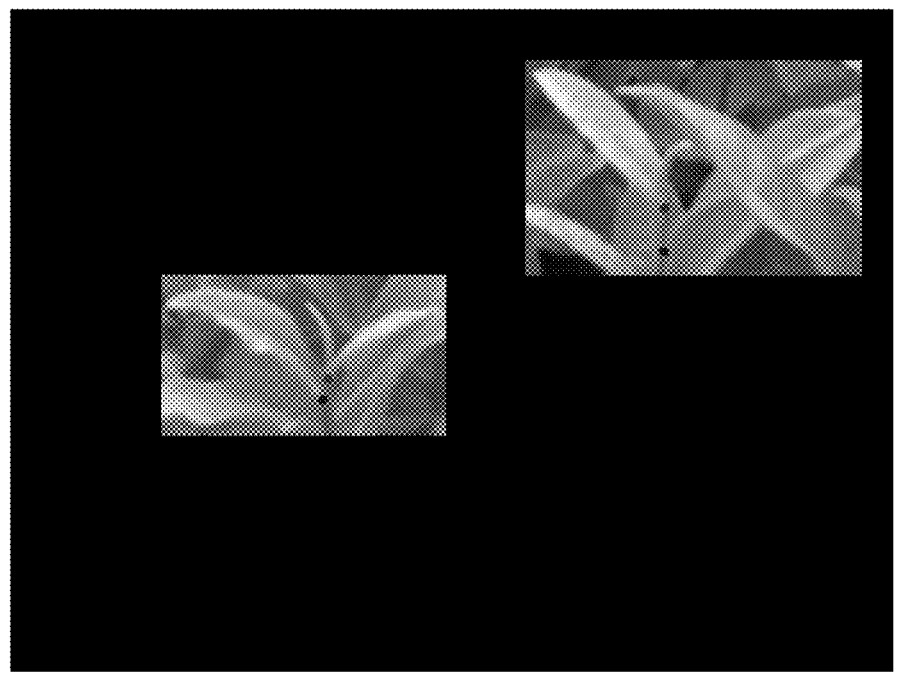
FIG. 7 is an effect diagram of the present invention after executing the keypoint detection model on the tea-bud thermal image and the tea-bud RGB image.

Step S60: tea-bud keypoint positions are obtained according to the image pairs and the trained object detection model and keypoint detection model;

in this example, after obtaining the image pair I, the tea-bud picking point positioning device obtains the tea-bud keypoint positions according to the object detection model, the keypoint detection model and the image pair;

step S60 that tea-bud keypoint positions are obtained according to the image pairs and the trained object detection model and keypoint detection model may comprise the flowing steps:

step S61: object detection is carried out on the image pairs through the trained object detection model to obtain tea-bud detection results;

in this example, after obtaining the image pair I, the tea-bud picking point positioning device performs the object detection on the image pair through the trained object detection model to obtain the tea-bud detection results; as shown in FIG. 6, the object detection model Fo composed of the object detection model and the corresponding object detection model weight file is used to perform the object detection on the image pair to obtain the corresponding tea-bud detection frame; besides, the image in the detection frame is cropped, and its resolution is adjusted to a fixed resolution (128×224), so as to obtain the tea-bud detection results; FIG. 6 is an effect diagram of the present invention after executing the object detection model on the tea-bud thermal image and the tea-bud RGB image, and it only shows the detected buds on the tea-bud RGB image for easy visualization;

step S62: keypoint detection is carried out on the tea-bud detection results through the trained keypoint detection model to obtain the keypoint positions;

in this example, after obtaining the tea-bud detection results, the tea-bud picking point positioning device performs the keypoint detection on the tea-bud detection image pairs through the trained keypoint detection model to obtain the keypoint position; as shown in FIG. 7, the keypoint detection model $F_k$ composed of the keypoint detection model and the corresponding keypoint detection model weight file is used to perform the keypoint detection on the obtained tea-bud detection results in the tea-bud detection frame; FIG. 7 is an effect diagram of the present invention after executing the keypoint detection model on the tea-bud thermal image and the tea-bud RGB image, and it only shows the detected buds on the tea-bud RGB image for easy visualization; the keypoint detection model and the corresponding keypoint detection weight file together compose a function $F_k$, from which the positions of the keypoints P1 and P2 can be obtained:

$$F_k(\{((x1n,y1n),(x2n,y2n),sn)\}_{n=1}^{N}) = \{(Pxn,Pyn,Vn)\}_{n=1}^{N}$$

Figure 8:
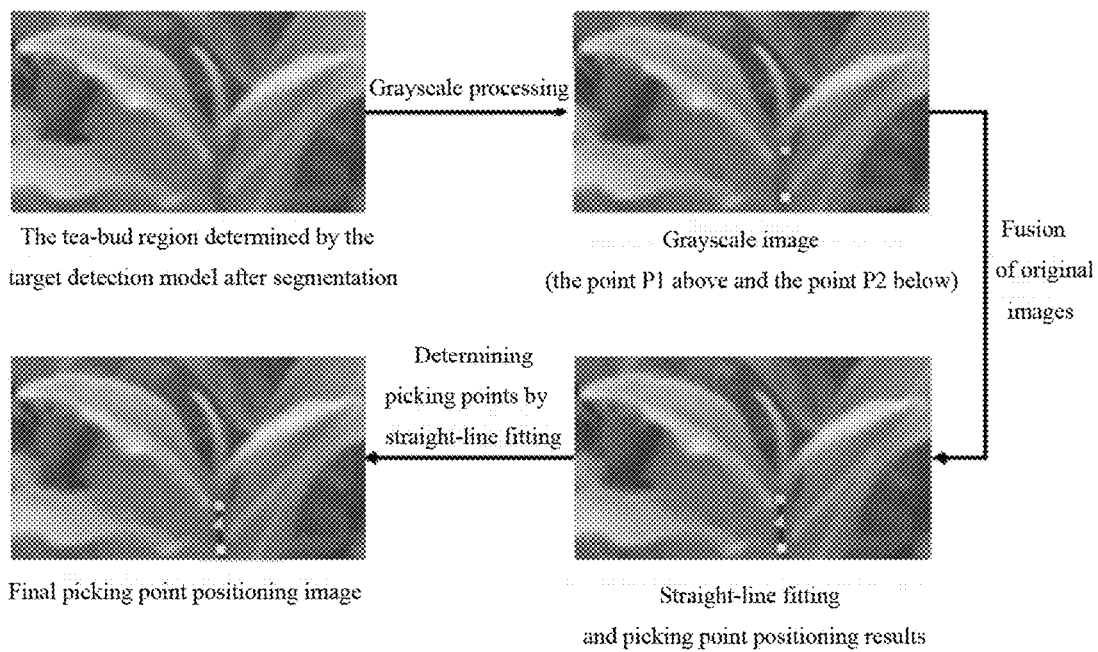
FIG. 8 is a flowchart of step S71 of the method for positioning tea-bud picking points based on fused thermal images and RGB images according to the present invention.
Figure 9:
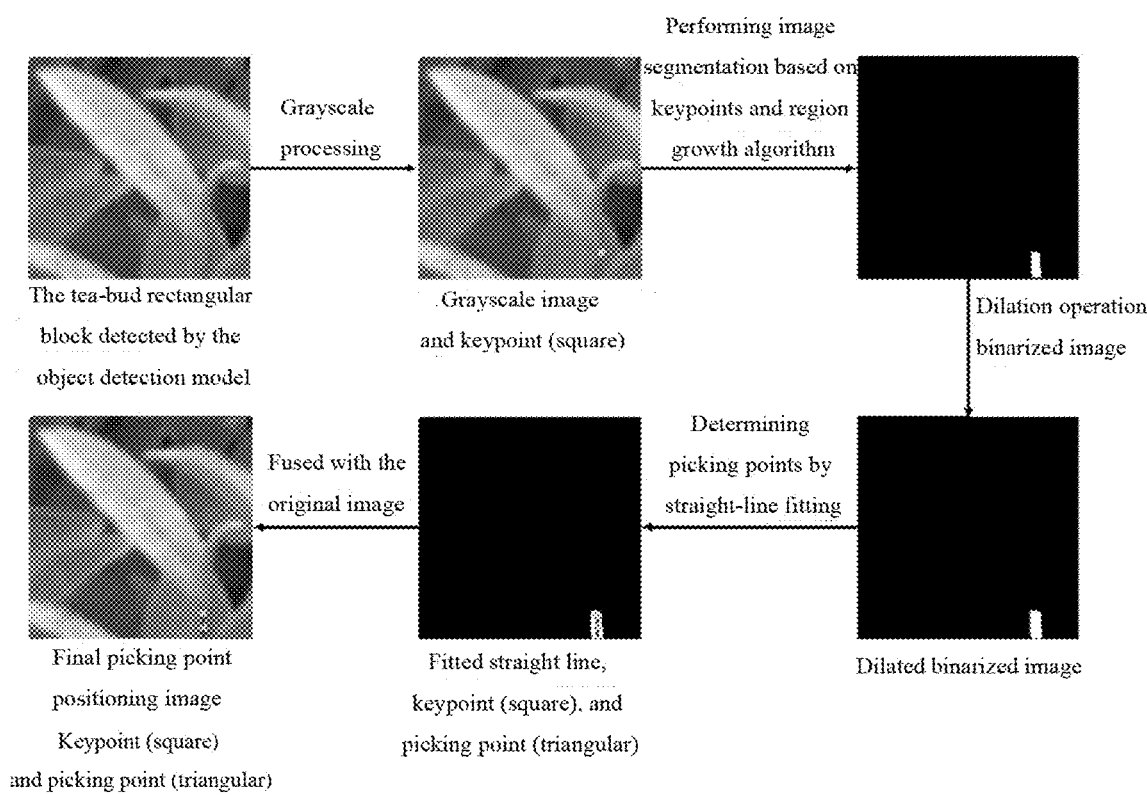
FIG. 9 is a flowchart of step S72 of the method for positioning tea-bud picking points based on fused thermal images and RGB images according to the present invention.

Step S70: tea-bud picking point positions are obtained based on the tea-bud keypoint positions and tea-bud growth characteristics;

in this example, after obtaining the tea-bud keypoint positions, the tea-bud picking point positioning device locates the tea-bud picking points in combination with the tea-bud growth characteristics and the tea-bud keypoint positions, so as to obtain the tea-bud picking point positions.

step S70 that tea-bud picking point positions are obtained based on the tea-bud keypoint positions and tea-bud growth characteristics may comprise the following steps:

step S71: when two points P1 and P2 are used as the tea-bud keypoints, as shown in FIG. 8, i.e. the points P1 and P2 exist simultaneously, and d is the Euclidean distance between the two keypoints, a straight-line equation is established by using the points P1 and P2, and a point on the line segment P1P2 with a distance of 0.4×d from the point P1 is taken as the tea-bud picking point position in combination with the keypoint position and the fitting straight-line equation according to the characteristic that the tea-bud picking point is always below and close to the keypoints; FIG. 8 is a flowchart of step S71 of the method for positioning tea-bud picking points based on fused thermal images and RGB images according to the present invention, and it only shows the detected buds on the tea-bud RGB image for easy visualization, wherein the square points represent the tea-bud keypoints detected by the model, and the triangular points represent the tea-bud picking points positioned by the present invention;

step S72: when one point(P1 or P2) is used as the tea-bud keypoint, as shown in FIG. 9, i.e. only one of the points P1 or P2 exists, image segmentation is performed based on the position and region growth algorithm of the point (P1 or P2) to obtain a binarized image of a tea-bud trunk and branches; the noise therein is filtered out by a dilation and erosion operation, then the binarized image is fitted by a straight-line fitting method, and finally the keypoint is shifted downward on the straight line by a preset distance (taking a shift value of 5 pixels) to determine the tea-bud picking point position in combination with the keypoint position and the fitting straight-line equation according to the characteristic that the tea-bud picking point is always below and close to the keypoint; FIG. 9 is a flowchart of step S72 of the method for positioning tea-bud picking points based on fused thermal images and RGB images according to the present invention, and it only shows the detected buds on the tea-bud RGB image for easy visualization, wherein the top and bottom square points represent the tea-bud keypoints detected by the present invention, and the triangular points represent the tea-bud picking points positioned by the present invention;

step S73: when the number of acquired tea-bud keypoints is zero (that is, no keypoint is detected), no subsequent operation is made at this time;

Through the above solution, the example determines the picking points according to the growth posture of the tea buds, thereby ensuring that the coordinates of the positioned picking points all fall on the petiole of the tea buds, improving the integrity of the picked tea buds, reducing the influence of the surrounding environment on the positioning, and improving the positioning accuracy and efficiency of the tea-bud picking points.

It should be noted herein that the terms "comprising", "including" or any other variations thereof are intended to encompass a non-exclusive inclusion, such that a process, method, article or system comprising/including a series of elements comprises/includes not only those elements, but also other elements not expressly listed, or elements inherent in such a process, method, article or system. The phrase "comprising/including an element" does not preclude the presence of other identical elements in the process, method, article or system that comprises/includes the element, unless otherwise specified.

The serial numbers of the above-mentioned examples of the present invention are for description only, and do not imply the preference and non-preference of the examples.

From the above description of the embodiments, those skilled in the art can clearly understand that the methods in the above embodiments can be implemented through software and a necessary general hardware platform, and of course they can also be implemented through hardware, with the former being a better implementation in many cases. Based on this understanding, the technical solutions of the present invention, in essence or for the parts thereof that make contributions to the prior art, can be embodied in the form of a computer software product; this computer software product is stored in a storage medium as mentioned earlier (e.g. an ROM/RAM, a magnetic disc, and a compact disc), and includes several instructions for making a terminal device (e.g. a mobile phone, a computer, a server, an air conditioner, and network equipment) execute the methods described in the various examples of the present invention.

The above are only preferred examples of the present invention, and are not intended to limit the patent scope of the present invention. Any equivalent transformation of structures or processes made by using the description and drawings of the present invention, or directly or indirectly applying the description and drawings of the present inven-

What is claimed is:

1. A method for positioning tea-bud picking points based on fused thermal images and RGB images, wherein the method comprises the following steps:
   tea-bud image pairs, including tea-bud thermal images and tea-bud RGB images, of several tea buds are acquired;
   the tea-bud image pairs are each labeled to obtain a tea-bud object detection database and a tea-bud keypoint detection database;
   the tea-bud object detection database is inputted into an object detection model based on a deep convolutional neural network for training to obtain a trained object detection model;
   the tea-bud keypoint detection database is inputted into a keypoint detection model for training to obtain a trained keypoint detection model;
   the image pairs of tea buds to be picked are acquired by using an image acquisition device;
   tea-bud keypoint positions are obtained according to the image pairs and the trained object detection model and keypoint detection model; and
   tea-bud picking point positions are obtained based on the tea-bud keypoint positions and tea-bud growth characteristics.

2. The method for positioning tea-bud picking points based on fused thermal images and RGB images according to claim 1, wherein the step that the tea-bud image pairs are each labeled to obtain a tea-bud object detection database and a tea-bud keypoint detection database comprises the following steps:
   the tea-bud image pairs are each labeled according to input data formats of two tasks of object detection and keypoint detection, so as to obtain the corresponding object detection dataset and keypoint detection dataset; and
   the object detection dataset and the keypoint detection dataset are augmented to obtain the tea-bud object detection database and the tea-bud keypoint detection database, respectively.

3. The method for positioning tea-bud picking points based on fused thermal images and RGB images according to claim 1, wherein the step that the tea-bud object detection database is inputted into an object detection model based on a deep convolutional neural network for training to obtain a trained object detection model comprises the following steps:
   the tea-bud object detection database is divided into an object detection training set and an object detection validation set according to a first preset ratio;
   the object detection training set is inputted into the object detection model based on the deep convolutional neural network for training to obtain an object detection model weight file; and
   the trained object detection model weight file is loaded into the object detection model to obtain the trained object detection model.

4. The method for positioning tea-bud picking points based on fused thermal images and RGB images according to claim 1, wherein the step that the tea-bud keypoint detection database is inputted into a keypoint detection model for training to obtain a trained keypoint detection model comprises the following steps:
   the tea-bud keypoint detection database is divided into a keypoint training set and a keypoint validation set according to a second preset ratio;
   the keypoint training set is inputted into the keypoint detection model for training to obtain a keypoint detection model weight file; and
   the trained keypoint detection model weight file is loaded into the keypoint detection model to obtain the trained keypoint detection model.

5. The method for positioning tea-bud picking points based on fused thermal images and RGB images according to claim 4, wherein the step that the keypoint training set is inputted into the keypoint detection model for training to obtain a keypoint detection model weight file comprises the following steps:
   based on an HRNet network, an improved keypoint detection model is established by using Pytorch program; in the improved keypoint detection model, the number of the input layer of the keypoint detection model is improved to 4 channels for inputting a fused image of the thermal images and the RGB images; and
   the keypoint training set is continuously and iteratively inputted into the keypoint detection model in batches; when the model converges, the training of the keypoint detection model is completed, and the keypoint detection model weight file is obtained.

6. The method for positioning tea-bud picking points based on fused thermal images and RGB images according to claim 5, wherein loss functions of the keypoint detection model are as follows:

$$\min L = \lambda 1 \times L1 + \lambda 2 \times L2 + \lambda 3 \times L3;$$

$$L1 = \Sigma_{k=1}^{K}(\hat{y}(P_k) - y(P_k))^2;$$

$$L2 = d(P_1, C);$$

$$L3 = d(P_2, C);$$

among them, $\lambda 1$, $\lambda 2$ and $\lambda 3$ are weight coefficients of L1, L2 and L3, respectively; $P_k$ represents the k-th keypoint of a sample, $\hat{y}(P_k)$ represents a keypoint heat map predicted by the network, and $y(P_k)$ represents a heat map obtained from real values; and $d(P_1, C)$ represents the Euclidean distance from a tea-bud keypoint predicted by the network to the center C of a rectangular region where the keypoint is located.

7. The method for positioning tea-bud picking points based on fused thermal images and RGB images according to claim 1, wherein the step that tea-bud keypoint positions are obtained according to the image pairs and the trained object detection model and keypoint detection model comprises the following steps:
   the object detection is carried out on the image pairs through the trained object detection model to obtain tea-bud detection results; and
   the keypoint detection is carried out on the tea-bud detection results through the trained keypoint detection model to obtain the keypoint positions.

8. The method for positioning tea-bud picking points based on fused thermal images and RGB images according to claim 1, wherein the step that tea-bud picking point positions are obtained based on the tea-bud keypoint positions and tea-bud growth characteristics comprises the following steps:
   when two points P1 and P2 are used as the tea-bud keypoints, and d is the Euclidean distance between the two keypoints, a straight-line equation is established by using the points P1 and P2, and a point on a line segment P1P2 with a distance of 0.4×d from the point P1 is taken as the tea-bud picking point position; and when one point P1 or P2 is used as the tea-bud keypoint, image segmentation is performed based on the position and region growth algorithm of the point P1 or P2, so as to obtain a binarized image of a tea-bud trunk and branches; the noise therein is filtered out by a dilation and erosion operation, and then the binarized image is fitted by a straight-line fitting method, and the keypoint is shifted downward on the straight line by a preset distance to determine the tea-bud picking point position.

* * * * *